(12) United States Patent
Karube

(10) Patent No.: US 6,701,002 B1
(45) Date of Patent: Mar. 2, 2004

(54) TEST METHOD FOR IMAGE PICKUP DEVICES

(75) Inventor: Koji Karube, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 510 days.

(21) Appl. No.: 09/606,390

(22) Filed: Jun. 29, 2000

(30) Foreign Application Priority Data

Jun. 30, 1999 (JP) ............................................. 11-184838

(51) Int. Cl.$^7$ ................................................. G06K 9/00
(52) U.S. Cl. ........................ 382/145; 382/141; 382/216; 382/286; 382/294; 438/16; 438/18; 700/96; 700/121
(58) Field of Search ............................... 382/143, 141, 382/144, 145, 147, 148, 149, 151, 190, 282, 283, 284, 286, 287, 291, 293, 294, 295, 140, 146, 171, 216; 438/15, 16, 17, 18; 700/95, 96, 121

(56) References Cited

U.S. PATENT DOCUMENTS

| | | | | |
|---|---|---|---|---|
| 5,300,786 A | * | 4/1994 | Brunner et al. | 250/548 |
| 5,719,593 A | * | 2/1998 | De Lange | 345/422 |
| 5,726,716 A | * | 3/1998 | Egashira et al. | 348/580 |
| 5,757,957 A | * | 5/1998 | Tachikawa | 382/176 |
| 5,815,002 A | * | 9/1998 | Nikawa | 324/765 |
| 5,945,833 A | * | 8/1999 | Mil'shtein et al. | 324/751 |
| 5,994,914 A | * | 11/1999 | Tsuruta | 324/765 |
| 6,084,423 A | * | 7/2000 | Nikawa | 324/765 |
| 6,137,304 A | * | 10/2000 | Nikawa | 324/765 |
| 6,160,407 A | * | 12/2000 | Nikawa | 324/750 |

FOREIGN PATENT DOCUMENTS

| | | |
|---|---|---|
| DE | 36 37 017 | 5/1987 |
| DE | 38 05 366 | 8/1989 |
| DE | 43 05 578 | 9/1993 |
| DE | 689 09 606 | 2/1994 |
| DE | 195 21 408 | 12/1996 |
| DE | 196 23 327 | 12/1997 |
| JP | 10191307 A | 7/1998 |

* cited by examiner

Primary Examiner—Bhavesh M. Mehta
Assistant Examiner—Yosef Kassa

(57) ABSTRACT

In order to make it easier to specify the area with a shape other than a rectangle on the image plane of an image pickup device and to analyze an element in the range thereof, a test method of an image pickup device is provided, which comprises the steps of: preparing a plurality of layers in which a rectangular area may be specified; giving a priority for each layer; placing the layers on top of each other so as to divide an image plane of an image pickup device into a plurality of areas; specifying a certain area among the plurality of areas; and performing data analysis on pixels of an image pickup device in a specified area.

9 Claims, 9 Drawing Sheets

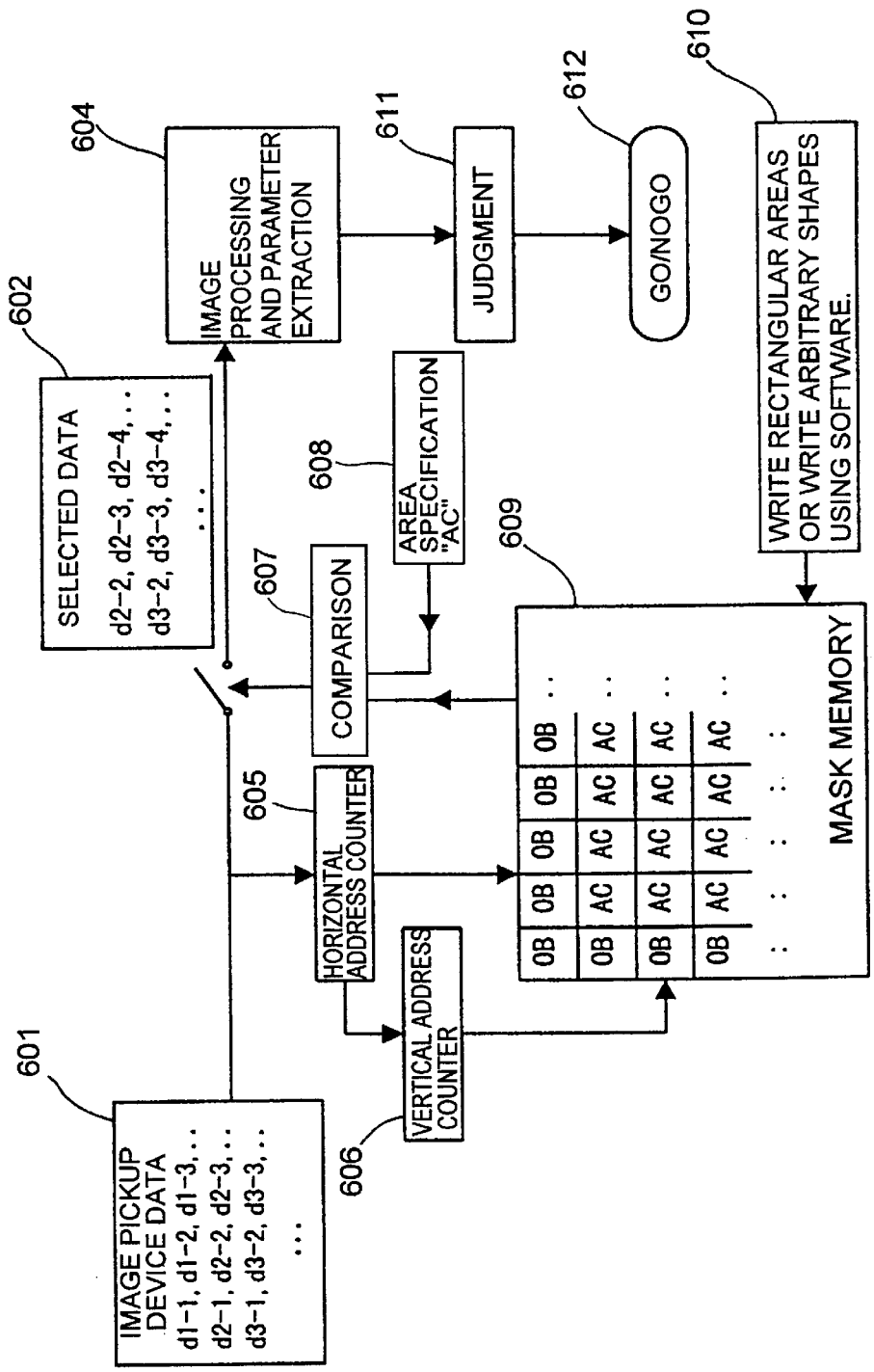

TEST METHOD FOR IMAGE PICKUP DEVICES

BACKGROUND OF THE INVENTION AND RELATED ART STATEMENT

1. Field of the Invention

The present invention relates to a test method for semiconductor image pickup devices, and more particularly relates to a method used for tests in which certain areas within an image plane of an image pickup device are specified for testing.

2. Description of the Related Art

Previously, in testing solid-state image pickup devices such as a CCD which constitutes and outputs a image data by using photo sensors arranged one-dimensionally or two-dimensionally, in addition to ordinary test items for integrated circuits, it is required to find the number of damaged portions on the pickup screen, kinds of sensitivity irregularities called "shading" or the like by various image processing calculations, and to judge the quality of the image pickup device. In the mass production test, in order to shorten the image processing time for a vast number of pixels, test equipment has often been equipped with specialized hardware for an image pre-processor which performs, for example, the sensitivity compensation corresponding to the color by taking out pixels in specified areas or the like as shown in Japanese Patent Publication for opposition (Kokoku) No. 1-61279.

When developing test procedures using such test equipment, in order to obtain the exact number of pixel data in row and column of an image pickup device and reference levels, it has been required for the test engineer to set the principal definitions of the coordinates of the start and end points of the optical black area (area optically masked) provided on the image pickup device, the coordinates of the start and end points of the pixel area where the color filter is arranged, the ordering of different color filters or the like to the hardware in the test equipment, and to construct a test program. However, recently, along with progresses in the area of digital still camera and CMOS image sensors, image pickup devices having a lot of pixels and a complex picture constitution have become common, and accordingly, it has increasingly become impossible to deal with testing requirements with specialized hardware only, and in such cases, some extra peripheral circuits or software processing has been added after hardware pre-processing to deal with tougher requirements, and the test development work has become considerably more tedious.

On the other hand, with the recent improvement of the computer technology for the multimedia or the like, it has become possible to obtain an image processing time comparable to that of a test using specialized hardware with the software processing alone, and special hardware is no longer essential for testing units in many instances. This removes limitations resulting from hardware functionalities and improves the flexibility. On the contrary, however, the setting of pixel areas and the image processing may be different depending the test engineer who develops the test define such tests. This can be a factor in preventing the test program from being reused.

According to the example disclosed in Japanese Patent Publication for Opposition No. 1-61279, a mask memory corresponding to each pixel of an image pickup device is prepared, and the definitions of the optical black and the color of the color filter are written therein. If there is a mask memory which corresponds one-to-one to each pixel, an area with an arbitrary shape can be specified, but actually, the specification is made such that the mask memory is set in rectangular areas specified by (1) the start coordinate, (2) the width, and (3) the height of the area. In many cases, simply such areas as area 101 and area 102 shown in FIG. 1 are specified. Since it is impossible to perform image processing by dividing areas more finely with hardware only, such divisions are described using software. It is, however, difficult to grasp the relationship between any two areas, making the test development work troublesome. Furthermore, in order to specify an area left after a rectangle area is cut out, many rectangles have to be connected to define such an area, again. For example, when specifying area 103 in FIG. 1, it is necessary to connect a total of 5 rectangular areas including an upper rectangle, an area between areas 101 and 102, a rectangle on the left side of area 101, a rectangle on the right side of area 102, and a lower rectangle. Setting and changing specified areas become extremely troublesome.

Moreover, it is often necessary to further divide the area where the color filter is arranged (in case of black-and-white image pickup devices, a part which is not optical black) into several areas and perform the image processing corresponding to each area. For example, in "zoning rules of shading of image signals" shown on Page 9 of the data sheet for a solid-state image pickup device ICX205AK published by Sony Corporation (in Japanese), it is specified to divide an area into 3 areas as shown in FIG. 2. In a testing unit described in Japanese Patent Publication for Opposition No. 1-61279, the masking of the disregarded area only can be performed by hardware processing, and therefore, it is necessary to separately define specifications using software processing after the hardware processing, in order to extract data for zones II and II'.

As for the division of color filter areas, as shown in the "Color Signal Evaluation Method" of Japanese Patent Publication for Opposition (Kokoku) No. 3-101582, an area is divided into a central part and several small peripheral parts. As shown in FIG. 3, however, if area 201 of the most important central part is taken first, and if the middle part left after cutting out the outermost peripheral area 206 is divided into 4 pieces in the four corner directions, the pieces are processed as areas 202, 203, 204, 205. Then, the specifications of a number of non-rectangular areas would become necessary, and descriptions using software also become complex. Furthermore, depending on the way of using an image pickup device to be tested, the size of the central area 201 changes, and depending on the manufacturing process for color filters, such adjustments as increasing the width of the peripheral area 206 to be cut out are often required, consuming considerable man-hours.

With a descriptive method similar to sequential programming which is common in the digital test, it is also possible to deal with shapes other than rectangles. That is, in addition to the specifications of (1) the start coordinate, (2) the width, and (3) the height, by accepting (4) the number of repeats and (5) subroutine calls, it is possible to describe various shapes including simple rectangular areas and complex polygons or a collection of discrete points in terms of software programs. Alternatively, only for the areas which are not rectangular and cannot be described by the conventional specification of (1) the start coordinate, (2) the width, and (3) the height, a pattern is generated by another program, and the result thereof is read into such a device as a "mask memory" described in the test equipment of Japanese Patent Publication for Opposition No. 1-61279, or numerical values may be stored in array valuables corresponding to a mask memory to be referred to for software processing, so that the area may be specified.

FIG. 11 shows the flow of processing image pickup device data according to conventional methods. After retrieving data 601 from an image pickup device which is simple one-dimensional dump data, mask data stored in coordinates of a mask memory for each data is retrieved while counting addresses with a horizontal address counter 605 and a vertical address counter 606, and it is checked (607) whether such data matches the attributes of a desired area specification or not (608) (in this case, whether or not the attribute is an "AC" indicating an active area), and when it matches the attribute, the image pickup device data is passed to the next processing as selected data 602. Next, this selected data 602 is subjected to the image processing and parameter extraction (604), and necessary judgment is performed (611), so that an image pickup device may be tested. Here, each mask data in a mask memory 609 is defined as a rectangular area, or it is prepared by storing a pattern with an arbitrary non-rectangular shape created by another program (610).

In this method, intuitive understanding of mask memory areas described by a sequence program or an external program can be difficult, and in addition to that, variable areas equal to or larger than the area of the image pickup device to be tested are required during the software processing, and therefore, the consumption of memory is massive due to a large number of pixels to be tested. It is also necessary to refer to large array variables for every pixel, and therefore, the throughput of software processing may significantly be lowered unlike hardware processing.

As a simple example of a conventional method, an area with a free shape is inputted by using a mouse pointer or the like similarly to a plotter software. However, while this method has the advantage that the operator can easily and intuitively understand a value when inputting it, the lowering of the throughput of the software image processing is inevitable since it is necessary to determine whether the inputted specified area can be stored in a large number of array variables to be referred to afterwards, or shapes and coordinates specified during input operations should be stored so that their correspondence to each pixel can be calculated and found during actual image processing.

OBJECT AND SUMMARY OF THE INVENTION

Conventionally, it has been required to specify an area by specifying rectangular areas and the connection thereof in an image pickup device, and therefore, the specification of the peripheral area after the cutting out of a central rectangular area and the specification or change of the areas made by the division have been troublesome. Accordingly, it is an object of the present invention to solve the above problems and provide an easier method for specifying, for example, a peripheral area around a central rectangular area without connecting several rectangular areas.

Furthermore, it is another object of the present invention to attain a proper degree of freedom which makes it possible to specify shapes other than simple rectangles when specifying and testing areas in an image pickup device without any increases in the consumption of memory or without any significant lowering of the throughput of software image processing caused by an increased degrees of freedom in area specification.

The present invention provides a test method of an image pickup device, comprising the steps of: preparing a plurality of layers in which a rectangular area may be specified; giving a priority for each layer or defining a priority among layers; placing the layers on top of each other so as to divide an image plane of an image pickup device into a plurality of areas; specifying a certain area among the plurality of areas; and performing a data analysis as for pixels of an image pickup device in a specified area.

The present invention further provides a method of judging to which area a given point in an image pickup plane belongs, comprising the steps of: preparing a plurality of layers in which a rectangular area may be specified; giving a priority for each layer; placing the layers on top of each other in accordance with the priority so as to divide an image pickup plane of an image pickup device into a plurality of areas; specifying a certain area among the plurality of areas; searching a rectangular area to which the horizontal and vertical coordinates of a certain point in an image pickup plane belong in turn from an upper layer; and terminating the search when a rectangular area to which the point belongs has been found and judging that the point belongs to the rectangular area at which the search is terminated.

A computer-readable recording medium in which a program for implementing the above method is recorded is also covered by the present invention.

The method of the present invention can be implemented on any suitable computer-based system that has arithmetic means such as a CPU, input means such as a mouse or keyboard, and display means such as a CRT.

In the present specification, the term "rectangle" is used to include "square", according to the formal definition of "rectangle". Furthermore, a straight line is treated as a rectangle with the width or height of 1, and a point is treated as a rectangle (square) with the width and height of 1.

According to the present invention, a suitable degree of freedom is attained in the specification of the peripheral area of a rectangle or the like so that complications associated with the area specification may be relieved while maintaining the intuitiveness of the conventional area specification using rectangles and a high software throughput, and in the meantime. Test programs can be developed with ease and reused for different devices more readily.

BRIEF DESCRIPTION OF THE DRAWINGS

FIG. 11 is a block diagram showing one example of the image processing process according to a conventional example.

DETAILED DESCRIPTION OF PREFERRED EMBODIMENTS

Figure 1:
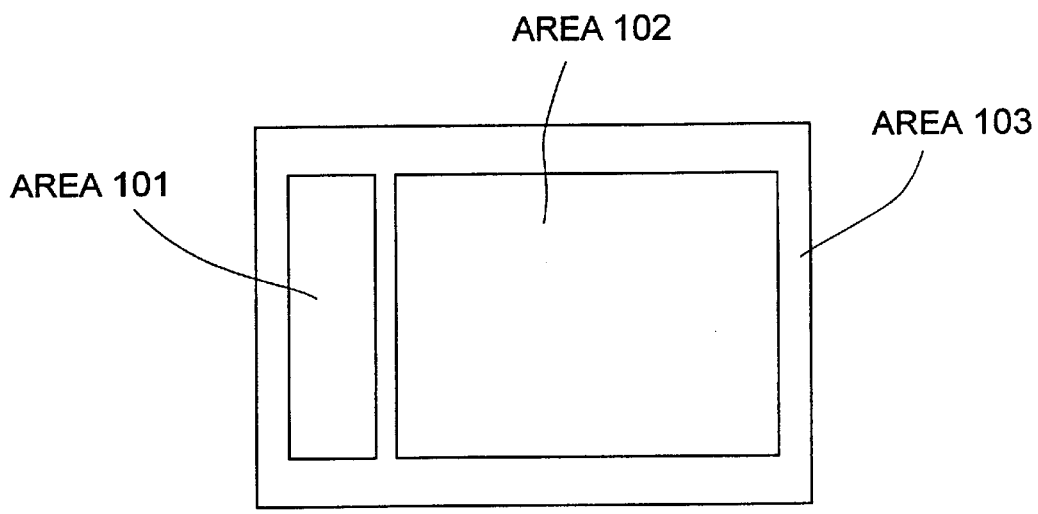
FIG. 1 is a plan view showing an example of a plurality of areas of an image pickup device.
Figure 2:
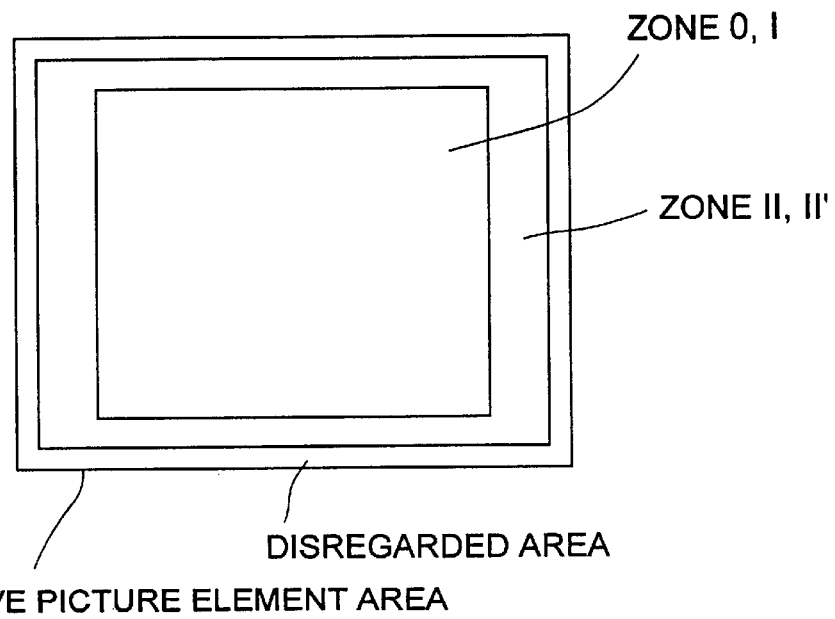
FIG. 2 is a plan view showing the area definition of an image plane of a solid-state image pickup device which is actually manufactured.
Figure 3:
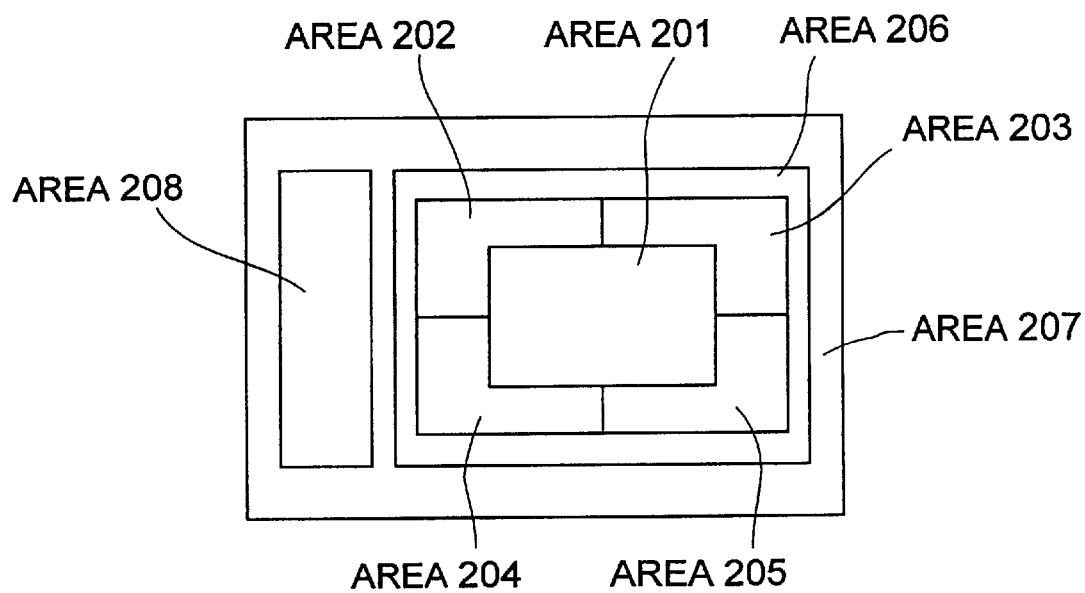
FIG. 3 is a figure showing an example in which an image plane of an image pickup device is divided into a plurality of areas.
Figure 4:
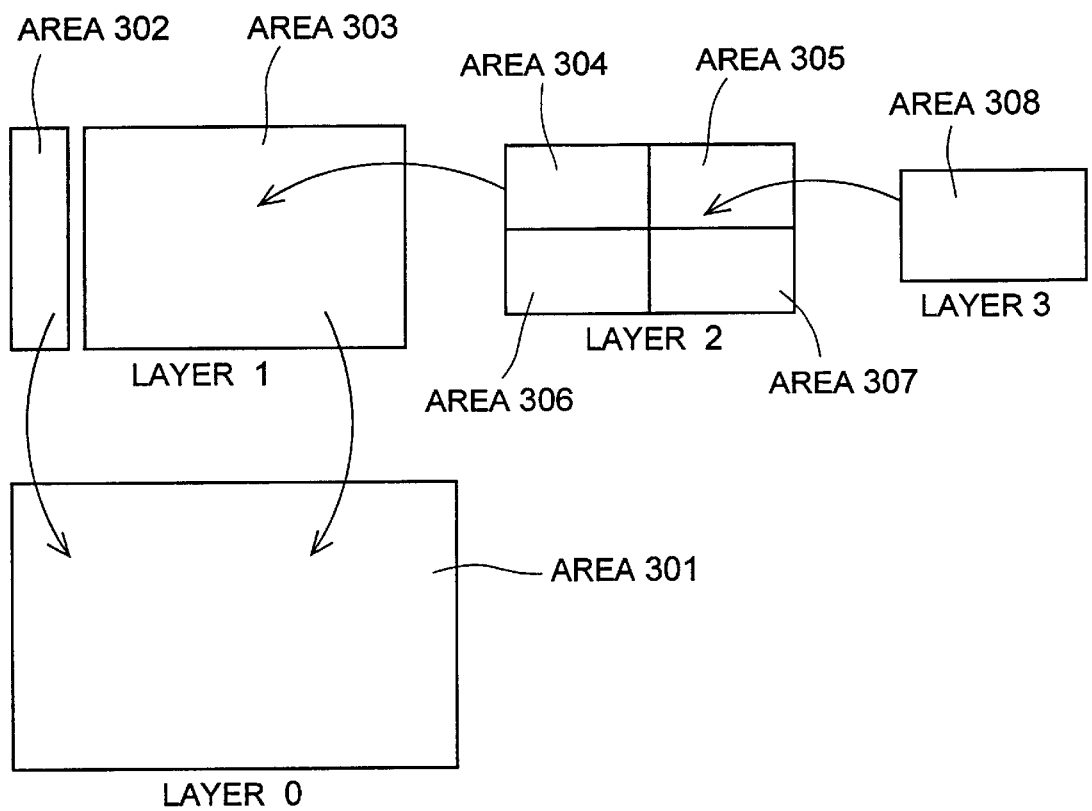
FIG. 4 is a figure showing one example of the state where a plurality of layers are overlapped for obtaining the area division of FIG. 3.

Previously, for example, as shown in FIG. 3, it has been considered that cutting out the central rectangle creates peripheral areas. According to the present invention, however, as shown in FIG. 4, it becomes possible to easily specify non-rectangular peripheral areas with a definition of a minimum number of rectangular areas. Such specification of non-rectangular areas has been troublesome according to conventional methods. This is solved by introducing a concept of layers. An optical black area 302 and a color filter area 303 are overlapped on area 301 covering the whole of an image plane, four divided areas 304, 305, 306, 307 are overlapped thereon, and central area 308 is overlapped further. At this moment, the upper and lower relationship of the respective layers can be specified according to the magnitude of a priority value for each layer (for example, numerical values such as 3, 2, 1, 0, −1 with larger numbers indicating upper layers) or by some other ordering methods.

Since the concept of layers is also necessary in the manufacturing process of an optical black and a color filter of an actual image pickup device, it is also familiar to the test engineer who develops a test program, and the intuitiveness of pattern recognition is also good. For example, according to a conventional specifying method, area 206 in FIG. 3 is specified by dividing the area into 4 long narrow rectangles and connecting the rectangles, and therefore, when the area of the central part is changed, it is necessary to correct the peripheral rectangles accordingly. According to the method of the present invention, however, it is unnecessary to change the peripheral rectangles.

By placing 8 such areas on top of each other, or by considering that the layers with specified areas are placed on top of each other in the order according to priorities from the lowermost layer to the uppermost layer, the division of areas previously shown in FIG. 3 can be realized. For example, when area 207 in FIG. 3 is to be specified, if the specification is performed by connecting several rectangular areas, it is necessary to define and connect 5 rectangular areas. However, if the same area 207 is recognized as an area made by removing areas 302 and 303 from area 301 as shown in FIG. 4, it can be defined by 3 large rectangular areas (areas 301, 302, 303). Here, while it can be considered that each of these areas 301, 302, 303 belongs to one layer, it is also possible to define that areas 302 and 303 belong to the same layer while area 301 belongs to another layer, for example.

According to such a way of defining area 207, not only the number of areas used for the definition is reduced from 5 to 3, but also area 207 can be recognized more intuitively. Even if it is required to change the size or shape of area 207, it can be expressed and redefined more easily. That is, when 3 large areas are defined and placed on top of each other, a new area corresponding to area 207 can easily be defined without paying much attention to coordination among them. On the other hand, if the area is defined within one plane, a new area can be defined with difficulty by separately defining 5 rectangular areas and combining them while paying careful attention to coordination among the five areas. If these two different ways are compared, it can be well understood how simple it is to specify a given area by combining layers according to the present invention.

For example, in the case of defining areas 202, 203, 204, and 205 in FIG. 3, it is also clear which is intuitively understandable and definable between the conventional and inventive way of defining and specifying: with the inventive way of simply considering that areas 304, 305, 306, 307 are formed by dividing one large rectangle into 4 pieces and placed on top of area 308, and the conventional way of separately considering areas 202, 203, 204, and 205 as collections of 8 separate small rectangles.

Figure 5:
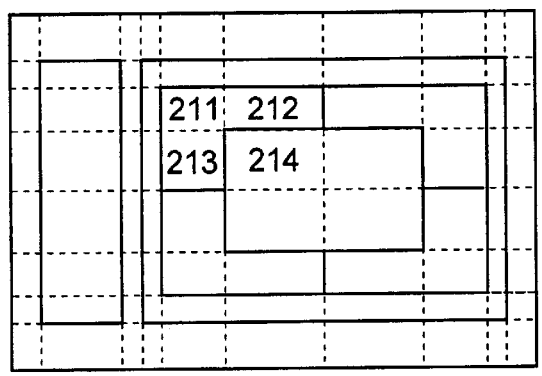
FIG. 5 is a figure showing an example of the area division obtained as a result of the overlapping of layers of FIG. 4.

As mentioned above, the present invention provides a method which is familiar to the test engineer and intuitive, and therefore, even if an area attribute for specifying a certain required area is changed after the definition of the area, it is easy to deal with such change. First, in order to perform area extraction during the actual image processing on the basis of 8 rectangular areas from area 301 to area 308 in FIG. 4 showing an example in which the concept of layers is used, horizontal and vertical lines are drawn from the top of a rectangle defining each area to divide the whole image plane into small rectangles as shown in FIG. 5. Then, any points of attribute changes rest on these horizontal and vertical lines, and on any other points, there are no changes in area attributes. Accordingly, in the areas surrounded by these lines, if the area attribute is determined or found for the first one point, it is unnecessary to do the same determination on the other points. In the example of FIG. 5, the whole area can be divided in the horizontal direction into a total of 21 pieces consisting of 11 lines including the leftmost vertical line and the rightmost vertical line and 10 planes held between those lines, and similarly, the area can be divided in the vertical direction into a total of 17 pieces consisting of 9 horizontal lines and 8 planes. If the area specification obtained according to the above is stored, data associated with a desired area can easily be retrieved. For example, in order to extract data for area 202 in FIG. 3, it is sufficient to determine which area a total of 25 pixel points belong to: one point for the inside of each divided rectangles (211 to 214), one point on each of the 12 lines divided into a shape of 2×2, and one point for each crossing of vertical and horizontal lines. It is not necessary to determine which area the other pixel points belong to.

Figure 6:
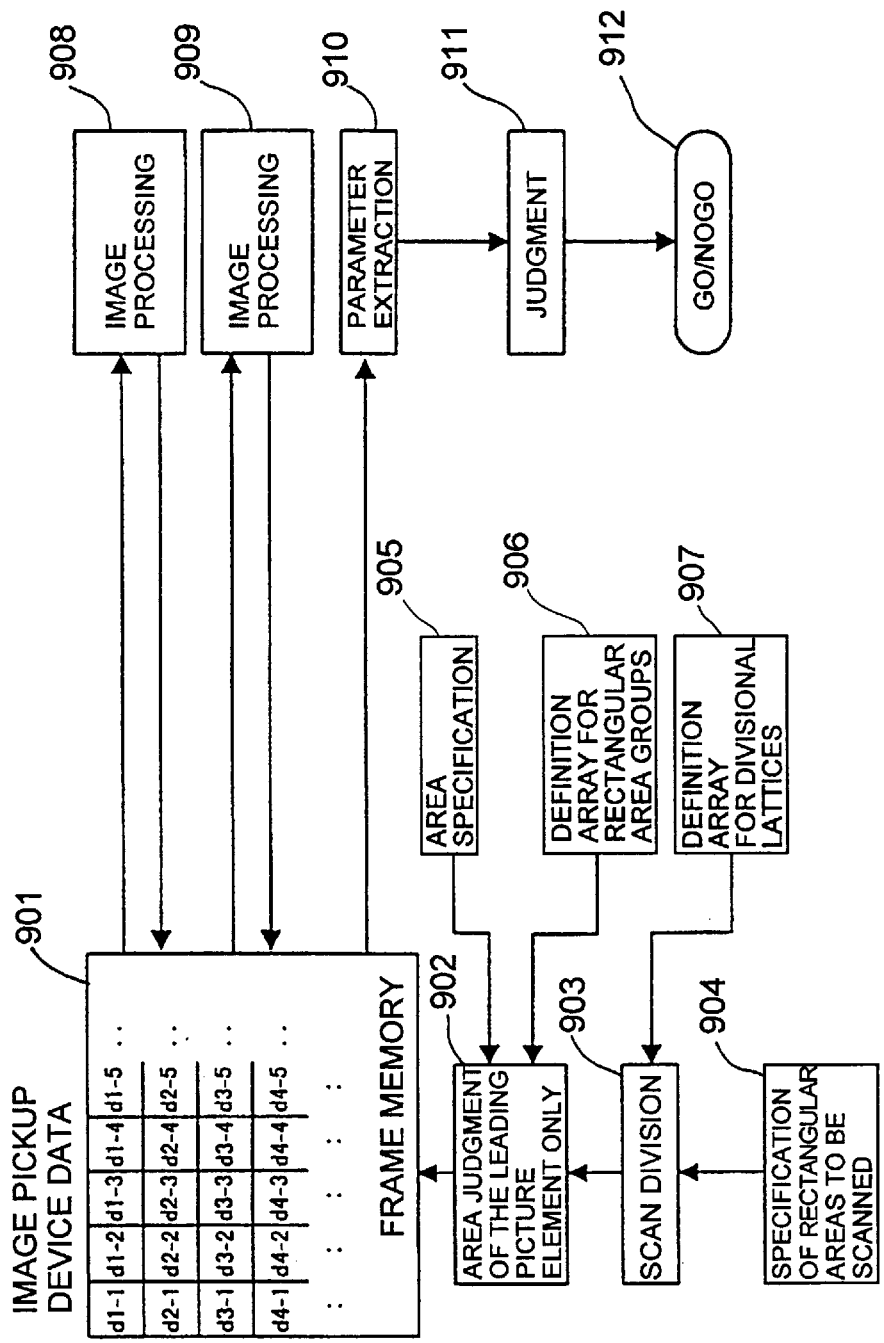
FIG. 6 is a block diagram showing an example of the image processing procedure according to one embodiment of the present invention.
Figure 7:
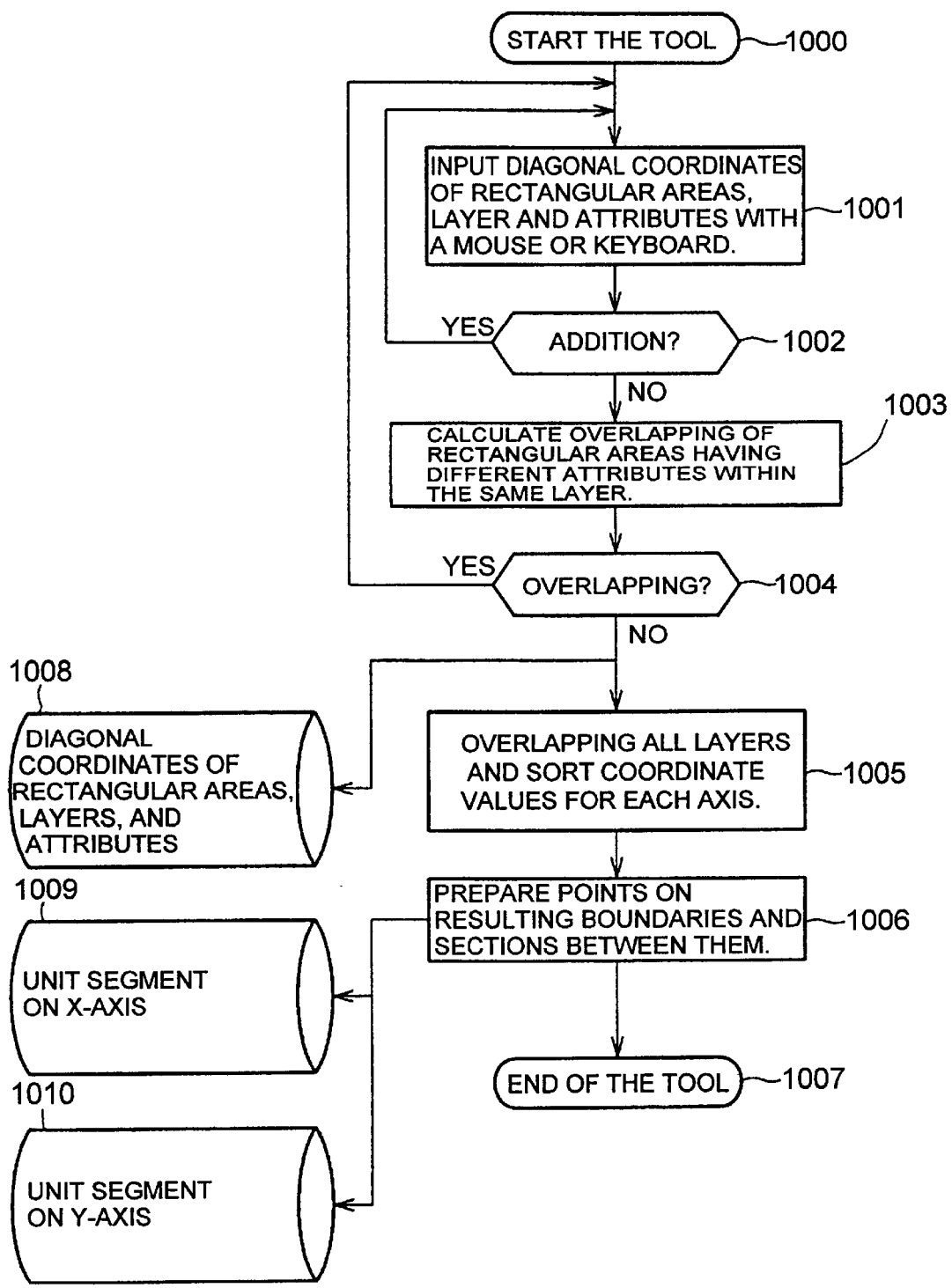
FIG. 7 is a flow chart of a software tool of the area division according to one embodiment of the present invention.

The flow of the data processing like what we have discussed above is shown in FIG. 6 to FIG. 9. Referring to FIG. 6, a plurality of layers and a rectangular area included in each area are defined in advance first by a mouse or key board (906). As shown in FIG. 7, overlapping of rectangles having different attributes in the same layer is excluded. In other words, if two or more rectangles have the same attribute, the rectangles may overlap (1003, 1004). Then, when the layers are placed on top of each other, the divisional lattice points which are cross points of the rectangles are defined so as to form a basis for area division (907), and further, sections between the lattice points are formed. Then a rectangular area in which the pixel data should be scanned is specified (904). Combining this specified rectangular area 904 and the data 907 on the divisional lattice points, lattice points to be considered are found (903). Then, the specification information 905 (such information as that the required area is an area with the attribute AC) for specifying the attribute of the required area is combined thereto, and the determination should be performed only at the first one point within the area specified to be scanned (902). This determination can be performed as described below by referring to FIG. 9. This result is compared with data (901) relating to each pixel of the image pickup device expanded in the frame memory. The selected data with the specified attribute is retrieved, and it is subjected to the image processing (908, 909), or it is subjected to other image processing such as a parameter extraction (910). Then, a necessary determination is performed for an image pickup device to be tested (911, 912).

FIG. 7 shows a software tool for obtaining the specifications of diagonal coordinates of the rectangular areas, layers and attributes, and the unit segments on X- and Y-axes. First, when this tool is started (1000), the diagonal coordinates of the rectangular areas, layers and attributes can be inputted by a mouse or keyboard (1001). Next, this tool asks whether an additional input item exists or not (1002). If not, it is calculated whether overlapping exists for the rectangular areas with different attributes within the same layer, and if overlap exists, it is urged to re-enter rectangular areas (1003, 1004). As a result, the specifications of the diagonal coordinates of the respective rectangular areas, layers and attributes are obtained (1008), and they are stored in a memory or file. Furthermore, all layers are placed on top of each other and coordinate values are sorted as for each axis of X- and Y-axes (1005), and consequently, points on the obtained boundaries and sections between them can be prepared (1006), and unit segments on X- and Y-axes can be obtained (1009, 1010). Such information is stored in the memory, and the tool ends (1007).

Figure 8:
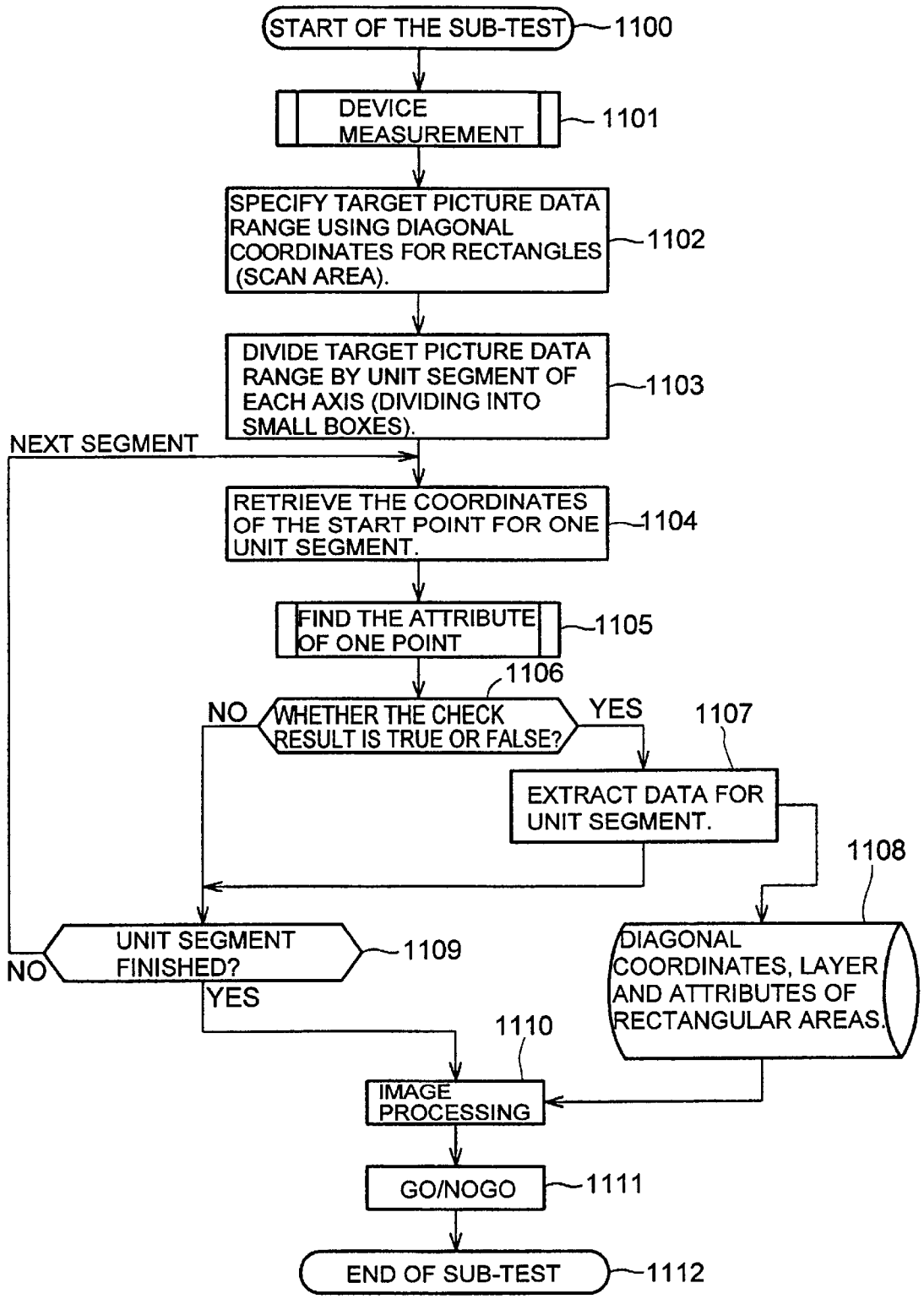
FIG. 8 is a flow chart of a sub-test for the test of an image pickup device according to one embodiment of the present invention.

FIG. 8 shows a flow chart of a sub-test for the image processing. First, when a program for this sub-test is started, the measurement of a device is performed. For example, in case of an image pickup device, it is turned on and put into operation, and resulting image data is stored in a file or memory (1101). Then, a target image data range is specified by the diagonal coordinates of the rectangle for the actual measured image data (1102). This is called a scan area. Then, this target image data range is divided by the unit segment (which may be called "small box") of each axis (1103). At this moment, the data related to the unit segments on X- and Y-axes obtained by the above-described tool shown in FIG. 7 is used. Next, the coordinates of the start point are retrieved for one unit segment (1104). The attribute is retrieved for this point (1105). If the result of the retrieval is true (1106), that is, if the point has the desired attribute, the data is extracted for the unit segment (1107). This data extraction is performed in turn until this process is carried out for all unit segments (1109). If the result of checking is false (1106) still, the step returns to the step (1104) of retrieving the coordinates of the start point for the next unit segment until the checking is finished for all unit segments. After that, when the data extraction has been completed for all unit segments, the image processing is performed (1110) by using the extracted data (1108). The necessary determination is performed (1111), and the sub-test ends (1112).

Figure 9:
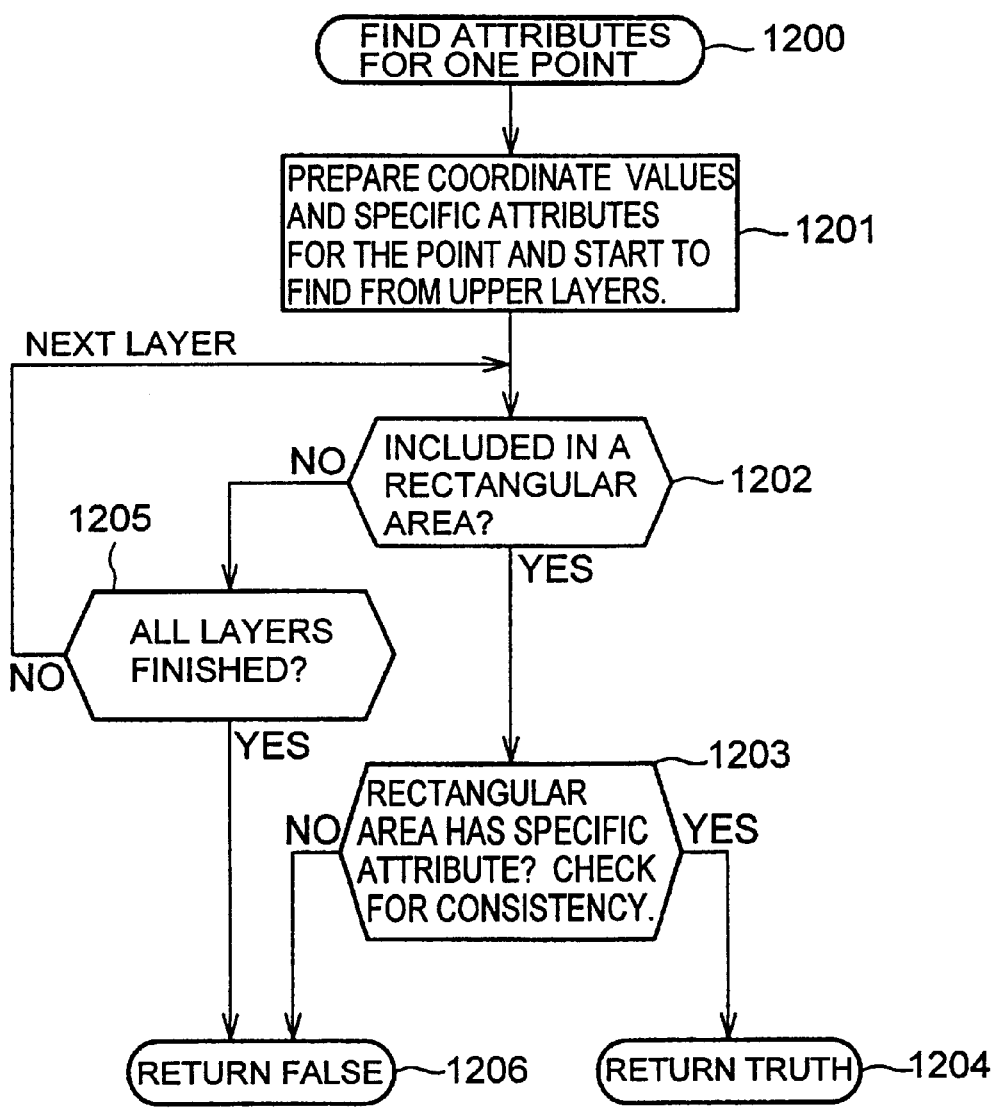
FIG. 9 is a flow chart of a subroutine for judging the attribute of one point on the image plane of an image pickup device according to one embodiment of the present invention.

FIG. 9 shows a subroutine (1200) for searching (1105) the attribute for a given point in FIG. 8. The coordinates of that point and the specified attribute are prepared, and the search process starts from the upper layer using the data on diagonal coordinates of the rectangular area, layers, and attributes prepared by the tool shown in FIG. 7 (1201). First, whether the point is included in some rectangular area or not is determined (1202). When the point is found included, whether the rectangular area has the specified attribute or not is checked (1203). If the rectangular area has the specified attribute, "true" is returned (1204), and if not, "false" is returned (1206). In the case when the point belongs to no rectangular area in the layer (1202), whether the checking has ended as for all layers is judged (1205), and if the checking has not finished, the step moves to the next layer and returns to the test of whether the point is included in a rectangular area or not (1202). If the search is finished for all layers, since the point does not belong to any of the rectangular areas, "false" is returned (1206).

Thus, according to the present invention, it also becomes easy to determine which area a given point belongs to, or which attribute the point has. That is, aside from the data extraction of the specified area, in order to determine which area an arbitrary point belongs to, it is sufficient to search whether the horizontal and vertical coordinates of the point is included in a rectangle or not in turn from the upper layer, and stop searching when the point is found to belong to one rectangle. In the example of FIG. 4, which rectangular area a given point belongs to is examined in turn from area 308 toward lower layers. If the point does not belong to area 302, it is sufficient to consider that the point belong to area 301 which is the whole of the image plane, and therefore, the determination can be performed only by examining whether the horizontal and vertical coordinates of the point exist in each area at the same time or not for 7 rectangle areas. According to the method like this, it is possible to perform the area specification for image processing, without lower throughput caused by referring each point (pixel) to the mask memory as in the conventional art.

As another embodiment of the present invention, it is also possible, in the block 902 of FIG. 6, to create the attribute of the first one point of each divided area shown in FIG. 5 and store it as a reference array or a reference table in advance from a definition array 906 for rectangular areas and use the reference array for judgments concerning areas. In this way, the reference array consumes memory, but if the number of divided areas is small, it is effective since area judgments can be done more quickly.

Figure 10:
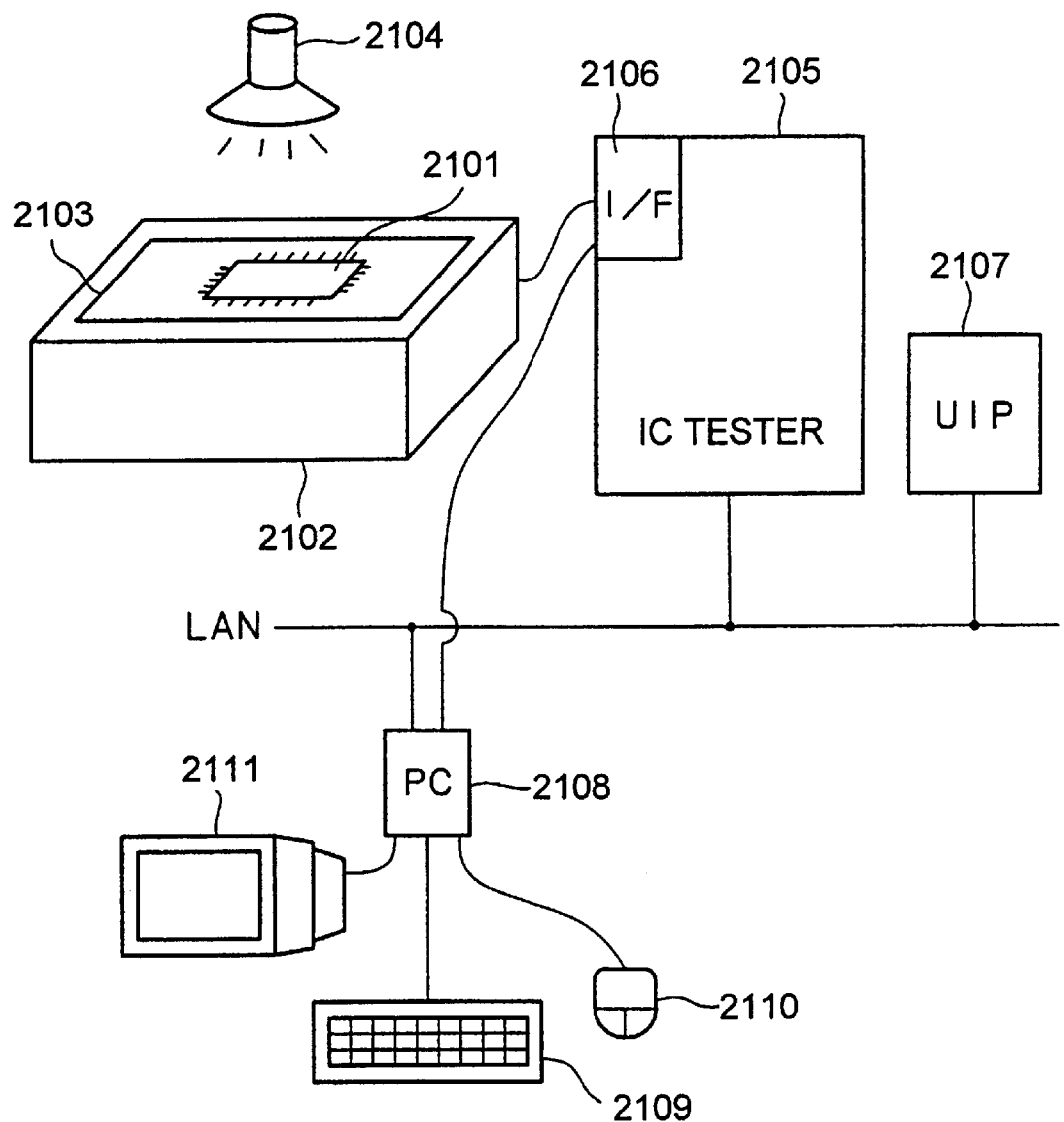
FIG. 10 is a figure showing a structural example of a test system of an image pickup device capable of implementing the present invention.

The above method can be implemented by using any computer system. As an example, a system as shown in FIG. 10 can be used. First, in an image pickup device 2101 that is a DUT (Device Under Test), an electric connection is established through a DUT board 2103 placed on a test head 2102. Then, light is irradiated onto the image pickup device 2101 by a light source 2104, and with the control from an IC tester 2105, an electric signal is outputted from the image pickup device. The operator performs the control on this IC tester 2105 from a user-interface control processor (UIP) 2107 through a LAN such as Ethernet or a bus. The digital data outputted from the DUT board 2103 is sent to an interface 2106 of the IC tester 2105 through an interface board (not shown in the figure) provided in the test head 2102. The timing of this data is adjusted by a timing control unit (not shown in the figure) in the IC tester, and it is sent into an image-processing unit 2108. Here, the image processing unit 2108 comprises a key board 2109 operated by the operator, a mouse 2110, a display 2111 or the like, and it is a unit which can perform the necessary processing and display for the received digital data, and for example, it is constituted on the basis of a computer such as a personal computer or a workstation. Furthermore, the image processing unit 2108 is connected to the IC tester 2105 and the UIP 2107 through a LAN such as Ethernet or a bus, so that the test information and the result of processing can mutually be transmitted and received.

The method of the present invention can be implemented in such away that the image processing is performed for separate areas and the processing is performed for the total picture made by combining the separate areas in the image processing unit 2108 like this, and on the other hand, it is also possible to perform the calculation on the IC tester 2105 in parallel during the processing in the image processing unit 2108, in the case when the number of pieces of pixels of the image pickup device is increased or a processing at a higher speed is required according to the increase of the number of test items. Then, it is also possible to perform an off-line debugging with a viewer on the UIP 2107 and exclusively perform that on the IC tester 2105. Furthermore, the method of the present invention can also be materialized by the processing with an ASIC or in the form of packaged hardware.

The entire disclosure of Japanese Paten Application No. 184838/99 filed on Jun. 30, 1999 including the specification, claims, drawings and summary are incorporated herein by reference.

What is claimed is:

1. A method for testing each pixel of a surface area of an image pickup device, comprising the steps of:
    preparing, by an image processor for processing data outputted through a device under test (DUT) board establishing electrical contact with the image pickup device and in accordance with timing signals from an IC tester, the surface area of the image pickup device into a plurality of layers having a rectangular area;
    assigning a priority for each layer prepared by the image processor;
    overlapping the layers in accordance to the assigned priority;
    dividing the surface of the image pickup device into a plurality of areas, including rectangular areas for layers having a high priority and non-rectangular areas for layers having a low priority;
    specifying, by the image processor, a certain area among the plurality of areas; and
    performing a data analysis of the pixels of the image pickup device in the specified area.

2. A computer-readable record medium in which a program for implementing the method of claims 1 is recorded.

3. A system in which the method of claim 1 is implemented.

4. A method of judging to which area of an image pickup device surface area each pixel of the image pickup device belongs, comprising the steps of:
    preparing, by an image processor for processing data outputted through a device under test (DUT) board establishing electrical contact with the image pickup device and in accordance with timing signals from an IC tester, the surface area of the image pickup device into a plurality of layers that include a rectangular area;
    assigning a priority to each layer by the image processor;
    overlapping the layers according to the assigned priority;
    dividing the surface of the image pickup device into a plurality of areas, including rectangular areas for layers having a high priority and non-rectangular areas for layers having a low priority;
    determining, from an upper layer to a lower layer, an area to which a horizontal and a vertical coordinates of a pixel in the surface area belongs by the image processor; and
    terminating the determination when a rectangular area to which the pixel belongs is determined by the image processor.

5. A computer-readable record medium in which a program for implementing the method of claim 4 is recorded.

6. A system in which the method of claim 4 is implemented.

7. A method of judging to which area, of a plurality of areas of an image pickup device, each pixel in the image pickup device belongs, comprising the steps of:
    inputting, to an image processor for processing data outputted through a device under test (DUT) board establishing electrical contact with the image pickup device and in accordance with timing signals from an IC tester, diagonal coordinates of a plurality of rectangular areas, attributes thereof, and layers to which the respective rectangular areas belong, wherein the plurality of areas of the surface of the image pickup device are defined by overlapping the plurality of layers of rectangular areas;
    determining whether overlapping exists between rectangular areas having different attributes and belonging to the same layer;
    returning to the step of inputting when overlapping does exist;
    outputting data related to the diagonal coordinates of the rectangular areas, attributes, and layers when it is determined overlapping does not exist between the rectangular areas;
    placing all of the layers on top of each other;
    sorting coordinate values for each coordinate axis of the layers;
    preparing coordinates on boundaries obtained by the sorting and sections therebetween, using the image processor; and
    outputting, from the image processor, the resulting sections as unit segments on each coordinate axis.

8. A computer-readable record medium in which a program for implementing the method of claim 7 is recorded.

9. A system in which the method of claim 7 is implemented.

* * * * *